United States Patent
Yeh et al.

(10) Patent No.: US 7,546,404 B2
(45) Date of Patent: Jun. 9, 2009

(54) METHOD AND APPARATUS FOR ARBITRATION IN A WIRELESS DEVICE

(75) Inventors: Chih-Hao Yeh, Taipei County (TW); Jiun-Jang Su, Taipei (TW); Ying-Chao Chuang, Taichung County (TW)

(73) Assignee: Mediatek Inc., Hsin-Chu (TW)

( * ) Notice: Subject to any disclaimer, the term of this patent is extended or adjusted under 35 U.S.C. 154(b) by 144 days.

(21) Appl. No.: 11/847,405

(22) Filed: Aug. 30, 2007

(65) Prior Publication Data

US 2009/0063740 A1 Mar. 5, 2009

(51) Int. Cl.
*G06F 13/00* (2006.01)
*H04L 12/28* (2006.01)

(52) U.S. Cl. .......... 710/117; 370/338; 370/339; 455/41.2

(58) Field of Classification Search .......... 710/117; 370/338, 339; 455/41.2
See application file for complete search history.

(56) References Cited

U.S. PATENT DOCUMENTS

| | | | |
|---|---|---|---|
| 2005/0059347 A1* | 3/2005 | Haartsen | 455/41.2 |
| 2005/0282494 A1* | 12/2005 | Kossi et al. | 455/41.2 |
| 2006/0292986 A1* | 12/2006 | Bitran et al. | 455/41.2 |
| 2007/0098004 A1* | 5/2007 | Lada | 370/437 |
| 2007/0223430 A1* | 9/2007 | Desai et al. | 370/338 |
| 2007/0275746 A1* | 11/2007 | Bitran | 455/509 |
| 2008/0123610 A1* | 5/2008 | Desai et al. | 370/339 |
| 2008/0161041 A1* | 7/2008 | Pernu | 455/553.1 |
| 2009/0067396 A1* | 3/2009 | Fischer | 370/338 |

* cited by examiner

*Primary Examiner*—Glenn A Auve
(74) *Attorney, Agent, or Firm*—Thomas, Kayden, Horstemeyer & Risley

(57) ABSTRACT

A method and apparatus for traffic arbitration in a system are provided. In the system, a first module operating in a first protocol and a second module operating in a second protocol share one communication channel. An arbitration circuit schedules medium accesses thereof, in which a quota table maintains a utilization value updated in accordance with the amount of time slots consumed by a particular traffic type, and a time counter periodically resets the utilization value to a default value. When the arbitration circuit receives a request for medium access of the particular traffic type, the arbitration circuit grants the request according to the utilization value, such that the first module or the second module are not activated at the same time.

25 Claims, 5 Drawing Sheets

METHOD AND APPARATUS FOR ARBITRATION IN A WIRELESS DEVICE

BACKGROUND OF THE INVENTION

1. Field of the Invention

The invention relates to packet traffic arbitration, and in particular, to a quota-based traffic management method for a device comprising both WLAN and Bluetooth modules.

2. Description of the Related Art

Typically, when multiple stations operating with different protocols share one common communication channel such as wireless radio frequency bands or wired cable connections, additional procedure is required to arbitrate packet traffics among the stations. WLAN and Bluetooth modules within a common system are taken as an example and explained in the following.

Referring to FIG. 1, a conventional wireless device 100 comprising both WLAN module 110 and Bluetooth module 120 is shown. According to predefined standards, WLAN module 110 and Bluetooth module 120 both operate at the same frequency band 2.4 GHz, and consequently, physical interferences are induced therebetween. Conventionally, IEEE 802.15.2 Packet Traffic Arbitration (PTA) is utilized to mitigate the physical interferences, whereby the WLAN module 110 and Bluetooth module 120 are activated exclusively in time domain. The PTA mechanism is basically a priority based control system. In FIG. 1, an arbitration circuit 130 is coupled to the WLAN module 110 and Bluetooth module 120, receiving request #RQ therefrom, and enabling either of them to perform RF activity such as medium access based on priorities of the request #RQ. A medium access operation may comprise either data transmission or data reception, or both.

Referring to FIG. 2a, a priority table 200 defining priorities of different traffic types is shown. In practice, traffic types are typically categorized into three types, Bluetooth (BT) synchronous connection oriented (SCO), BT asynchronous connectionless (ACL) and IEEE 802.11 WLAN traffics. IEEE 802.11 WLAN has the modest priority, while BT SCO traffic has the highest priority and BT ACL traffic lowest. It is noted that the priority table 200 is merely an example and designers can define priorities with respect to different traffics types for a system with coexisting WLAN and Bluetooth modules according to design necessity. When a request #RQ of a higher priority is issued from one module, traffic of a lower priority for the other module will be instantly suspended, and an exemplary flowchart is shown in FIG. 2b.

Referring to FIG. 2b, a flowchart showing conventional priority control according to FIG. 2a is shown. In step 201, a request #RQ from either WLAN module 110 or Bluetooth module 120 is issued, and its priority is looked up in the priority table 200. In step 203, the arbitration circuit 130 may check whether any traffic of higher priority is currently active on the opposing module. For example, if the request #RQ is issued from the WLAN module 110, the Bluetooth module 120 is checked, and vice versa. If a positive result is checked in step 203, the current request #RQ is rejected in step 209. Otherwise, if all other traffics of higher priorities are inactive on the opposing module, the request #RQ is granted, and the process goes to step 205. In step 205, traffic of lower priorities on the opposing module is unconditionally suspended. For example, when a request #RQ of IEEE 802.11 is issued from the WLAN module 110, the Bluetooth module 120 is checked whether a BT SCO traffic is active. The request #RQ of IEEE 802.11 is only granted when the BT SCO traffic is inactive, and when it is granted, any traffic of lower priority such as BT ACL on the Bluetooth module 120 will be forcibly suspended, allowing the traffic of IEEE 802.11 to be activated. In step 207, only when the traffic of lower priorities on the opposing module is suspended, the traffic corresponding to the granted request #RQ is initiated by sending an enable signal #EN to the module where the request #RQ is originated from. Steps 207 and 209 are followed by step 211, concluding the flowchart.

Summarizing, a request #RQ of the highest priority, such as BT SCO, will be unconditionally granted to interrupt RF activities of IEEE 802.11. On the other hand, a request #RQ of the lowest priority, such as BT ACL, is only granted when the traffic of IEEE 802.11 is inactive, and always vulnerable to interruptions from higher priority request #RQ when accessing medium. In other words, traffic of lower priority may not be efficiently accomplished when traffic of higher priority is existing, and the process of unconditionally suspending a requested medium access may significantly increase medium access failure. It is therefore desirable to provide an enhanced control approach to arbitrate traffics of multiple stations sharing a common channel.

BRIEF SUMMARY OF THE INVENTION

An exemplary embodiment of an arbitration circuit is provided, scheduling traffics of a first module and a second module co-located in a system sharing one communication channel to perform medium accesses of first and second protocols respectively. In the arbitration circuit, a quota table maintains a utilization value updated in accordance with the amount of time slots consumed by a particular traffic type, with a time counter periodically resetting the utilization value to a default value. When the arbitration circuit receives a request for medium access of the particular traffic type, the arbitration circuit determines whether to grant the request according to the utilization value, and allows the first or second module which issues the request to initiate the medium access of the particular packet type if the request is granted.

Another embodiment is an arbitration method implemented by the arbitration circuit. A quota table is first provided, maintaining a utilization value updated in accordance with the amount of time slots consumed by a particular traffic type. When a request for medium access of the particular packet type is issued from the first or second module, it is determined whether to grant the request for the medium access of the particular traffic type according to the utilization value.

A further embodiment is a system comprising the first and second modules, and the arbitration circuit. The first module operates in accordance with a first protocol, and the second module operating in accordance with a second protocol shares a communication channel with the first module. The arbitration circuit is coupled to the first and second modules to schedule traffics thereof and comprises a quota table and a time counter. The quota table maintains a utilization value updated in accordance with the amount of time slots consumed by a particular traffic type. The time counter periodically resets the utilization value to a default value. When the arbitration circuit receives a request for medium access of the particular traffic type, the arbitration circuit grants the request according to the utilization value such that the first module or the second module which issues the request initiates the medium access of the particular traffic type accordingly.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 3:
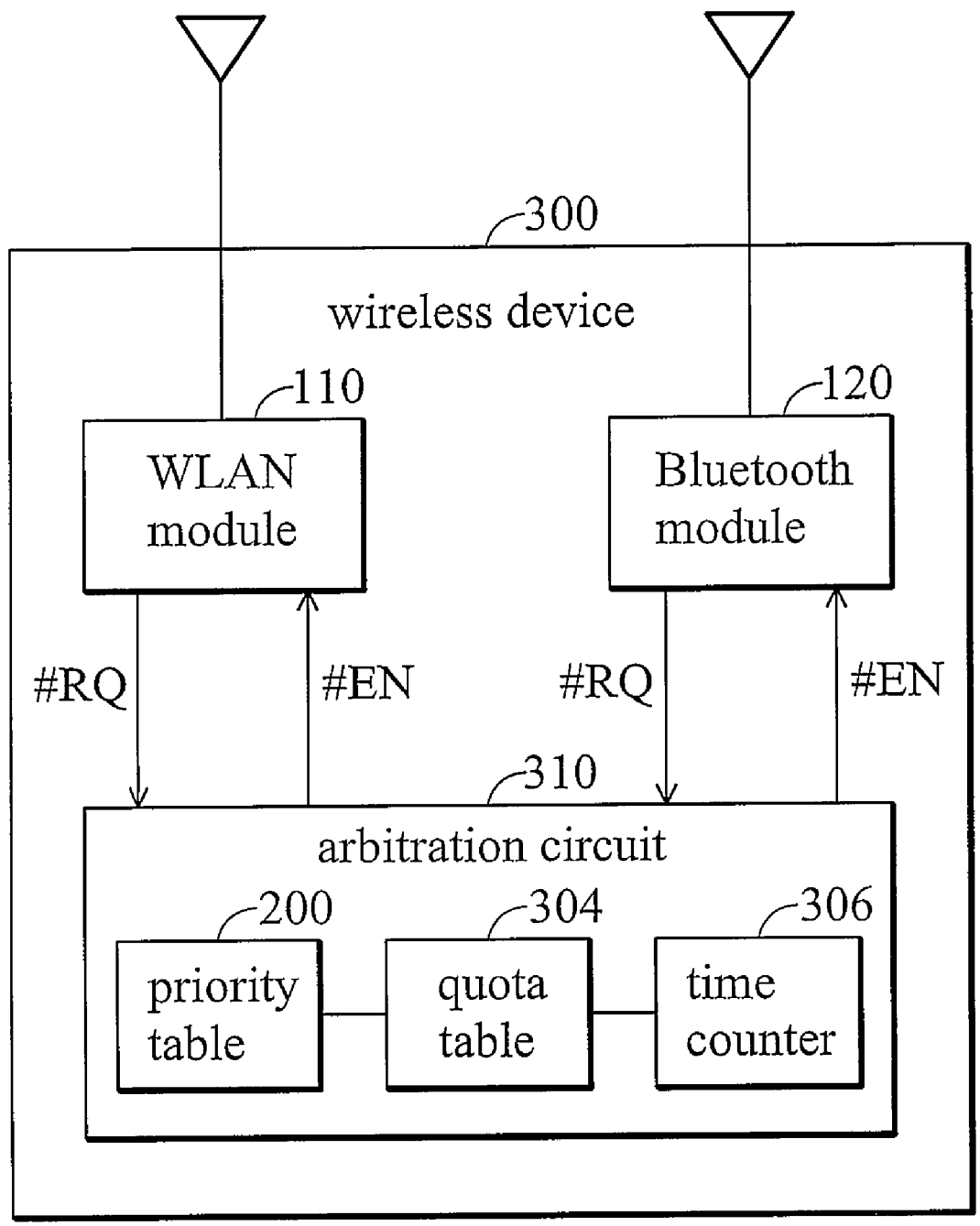
FIG. 3 shows an embodiment of a device 300 according to the invention.

The following description is of the best-contemplated mode of carrying out the invention. This description is made for the purpose of illustrating the general principles of the invention and should not be taken in a limiting sense. The scope of the invention is best determined by reference to the appended claims. For a system comprising two modules sharing one communication channel to deploy medium accesses of different protocols, an arbitration mechanism is desired to prevent conflicts. Referring to FIG. 3, an embodiment of a device 300 according to the invention is shown. In addition to the WLAN module 110 and Bluetooth module 120, an arbitration circuit 310 is provided to schedule medium accesses of the WLAN module 110 and Bluetooth module 120 in an exclusive fashion, such that time slots are not assigned to perform WLAN and Bluetooth RF actives at the same time. The device 300 combines the conventional priority control with a 'novel' quota management to form a hybrid control scheme. The arbitration circuit 310 comprises a priority table 200, a quota table 304 and a time counter 306. The priority table 200 is a programmable unit defining priorities of different traffic types, among which a particular traffic type may be assigned as a quota owner which owns the quota table 304. The quota table 304 is a memory cell recording a utilization value such as the total used quota or remaining quota. The total used quota is equivalent to total time slots consumed by the particular traffic type during a predefined period.

The time counter 306 is an independent unit to count the time, by which the utilization value recorded in the quota table 304 is reset to a default value at an interval equal to the predefined period. If the utilization value represents the total used quota, the default value is equivalent to zero, such that the total consumed time slots are periodically reset and recounted. In an alternative example, utilization value may represent remaining quota, thus subtraction is performed every time the quota is used. In this situation, the default value is equivalent to a reservation quota defined according to the predefined period. By defining the reservation quota, successfulness of medium accesses of lower priorities are guaranteed. For example, the predefined period may be 100 milliseconds (ms), and the reservation quota may be 1/10 the predefined period, say 10 ms. When the arbitration circuit 310 receives a request #RQ for medium access of the quota owner, the arbitration circuit 310 checks the quota table 304 to determine whether the reservation quota has run out. If the total consumed time slots do not exceed the reservation quota, it means there is still remaining quota available, thus the arbitration circuit 310 sends an enable signal #EN to the WLAN module 110 or Bluetooth module 120 where the request #RQ has originated from to grant medium access of the quota owner as if it has the highest priority.

In the situation where the granted RF activities may be interrupted by a request #RQ of higher priority in the middle, the arbitration circuit 310 updates the amount of used quota in the quota table 304 on completion of the medium access. Alternatively, the quota owner may be defined as halfway uninterruptible, such that a higher priority request #RQ issued from the opposing module does not affect the quota owner while the medium is accessed.

As described, the traffic types in the priority table 200 are categorized into an IEEE 802.11 traffic, a Bluetooth SCO traffic and a Bluetooth ACL traffic, and priorities of which are programmable and maintained in the priority table 200. The traffic types are not limited in the embodiment and other traffic types may also be defined depending on requirement. The particular traffic type which owns the quota table 304 is selected from one of the above traffic types, which is preferably a lowest priority traffic in need of quota protection to ensure a minimum performance.

Figure 1:
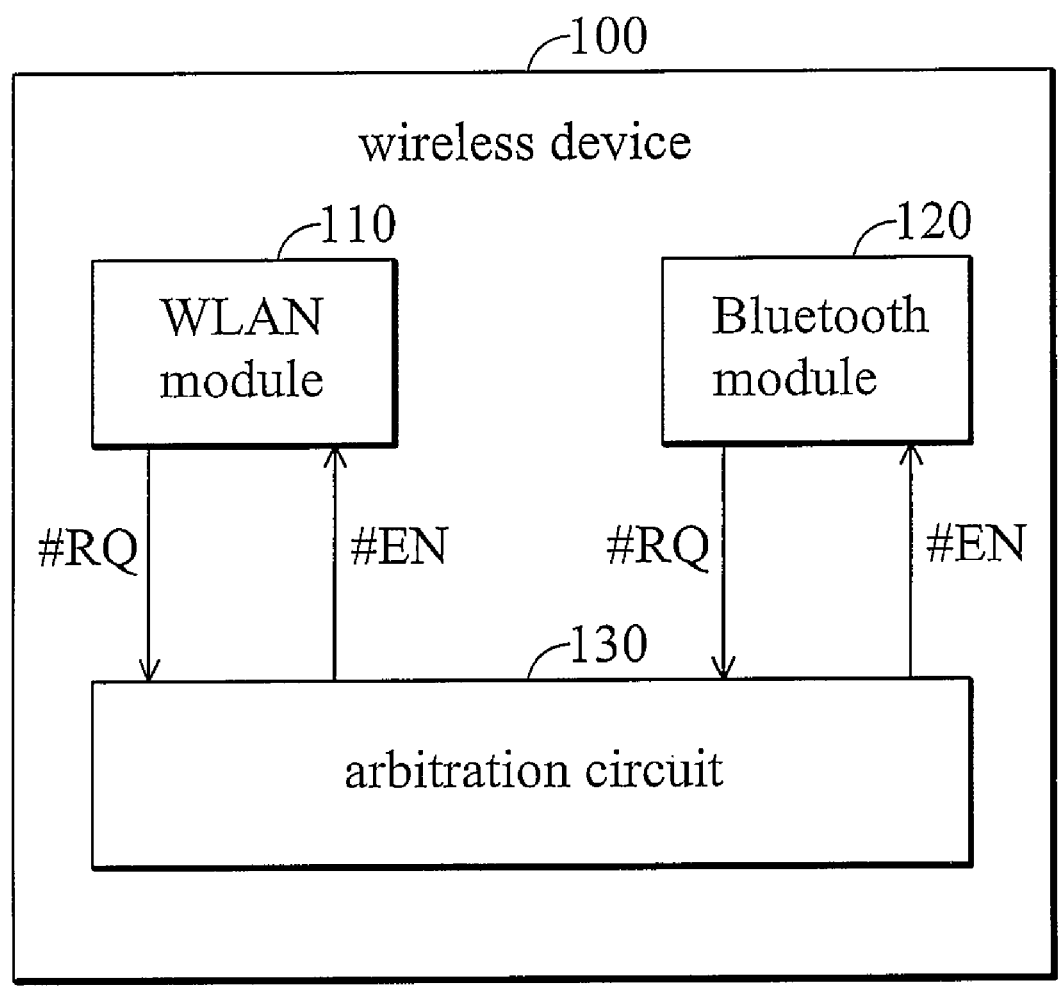
FIG. 1 shows a conventional wireless device 100 comprising both a WLAN module 110 and a Bluetooth module 120.
Figure 2A:
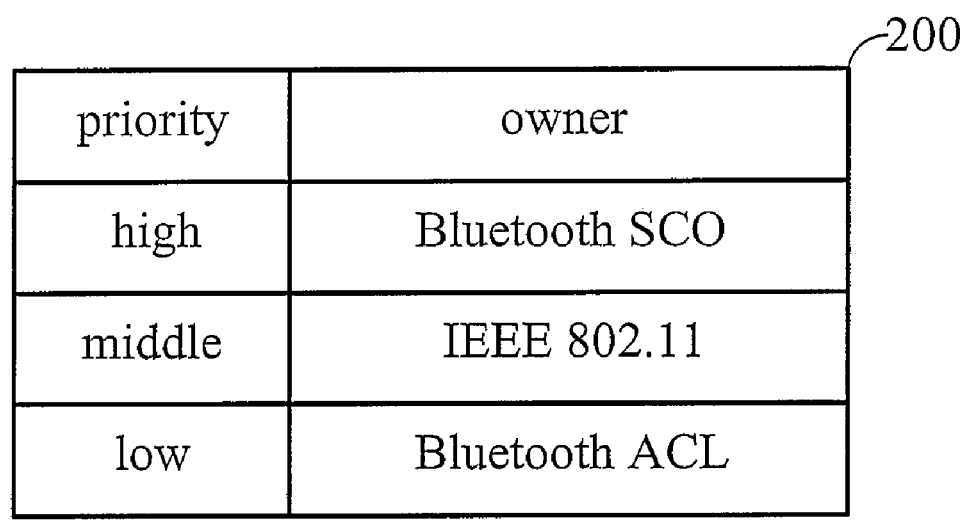
FIG. 2a shows an exemplary priority table 200 defining priorities of different traffic types.
Figure 2B:
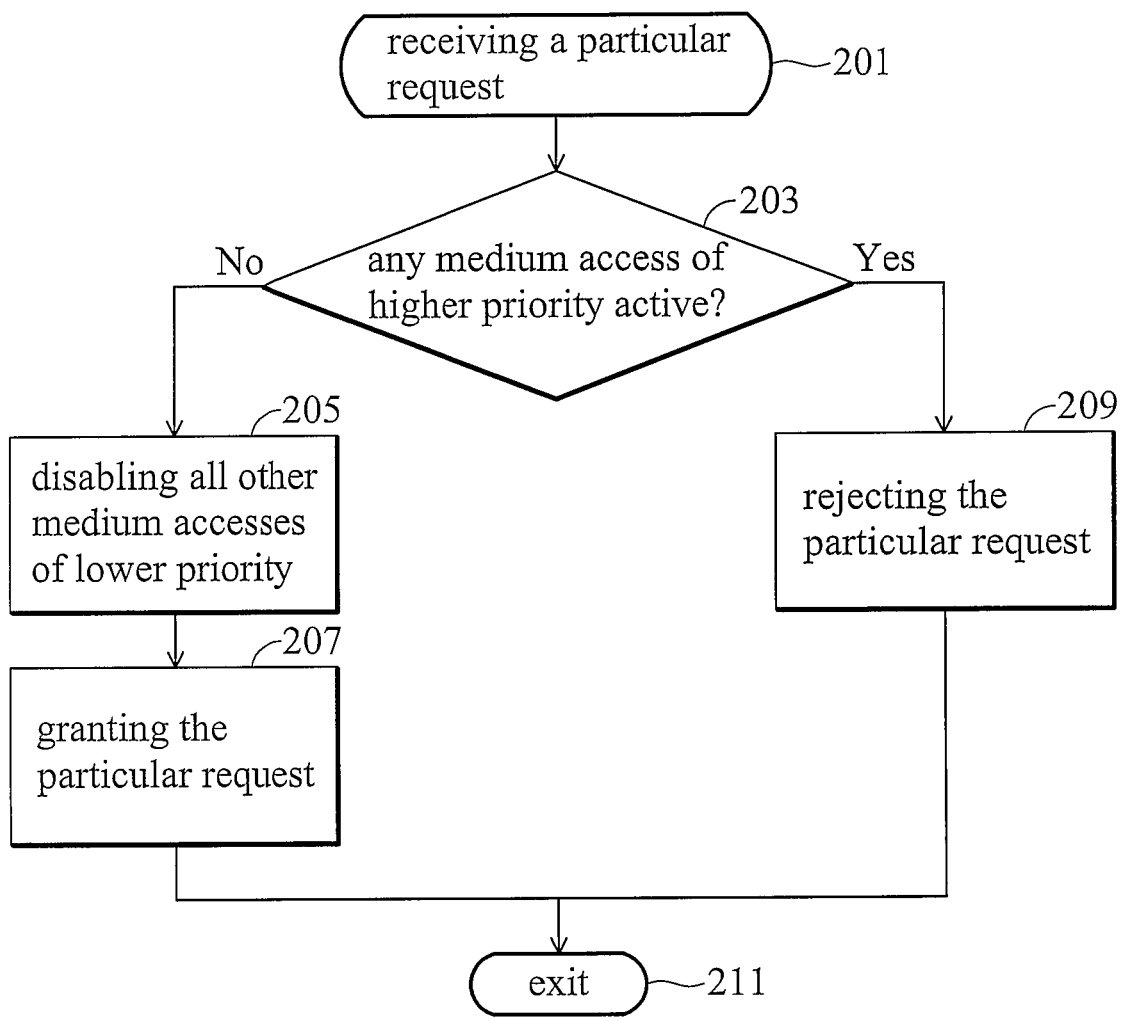
FIG. 2b is a flowchart showing conventional traffic management.

When the arbitration circuit 310 determines the reservation quota has run out, the quota owner does not enjoy the priority anymore, and a conventional priority controlling approach is used instead. Likewise, traffic types other than the quota owner do not benefit from the traffic reservation provided by the quota table 304, and are also processed in the conventional priority control approach. In this situation, referring to FIG. 2b, the arbitration circuit 310 looks up the priority table 200 and checks whether any traffic of higher priority is currently active on the opposing module; and the request is granted if all traffics of higher priority are inactive. When the request is granted, the arbitration circuit 310 suspends all traffics of lower priority to initiate the medium access or receiving corresponding to the granted request.

In an alternative embodiment, more than one quota tables 304 may be provided to preserve traffic for various traffic types, each of which is defined with a programmable reservation quota. When a request #RQ of a specific quota owner is issued from either the WLAN module 110 or the Bluetooth module 120, the arbitration circuit 310 checks respective corresponding quota table 304 to determine whether to grant a medium access. Since a request #RQ of lower priority has higher possibility to be rejected or interrupted, the usage of quota tables 304 efficiently increases the possibility of successful transmitting of lower priority traffics.

Figure 4:
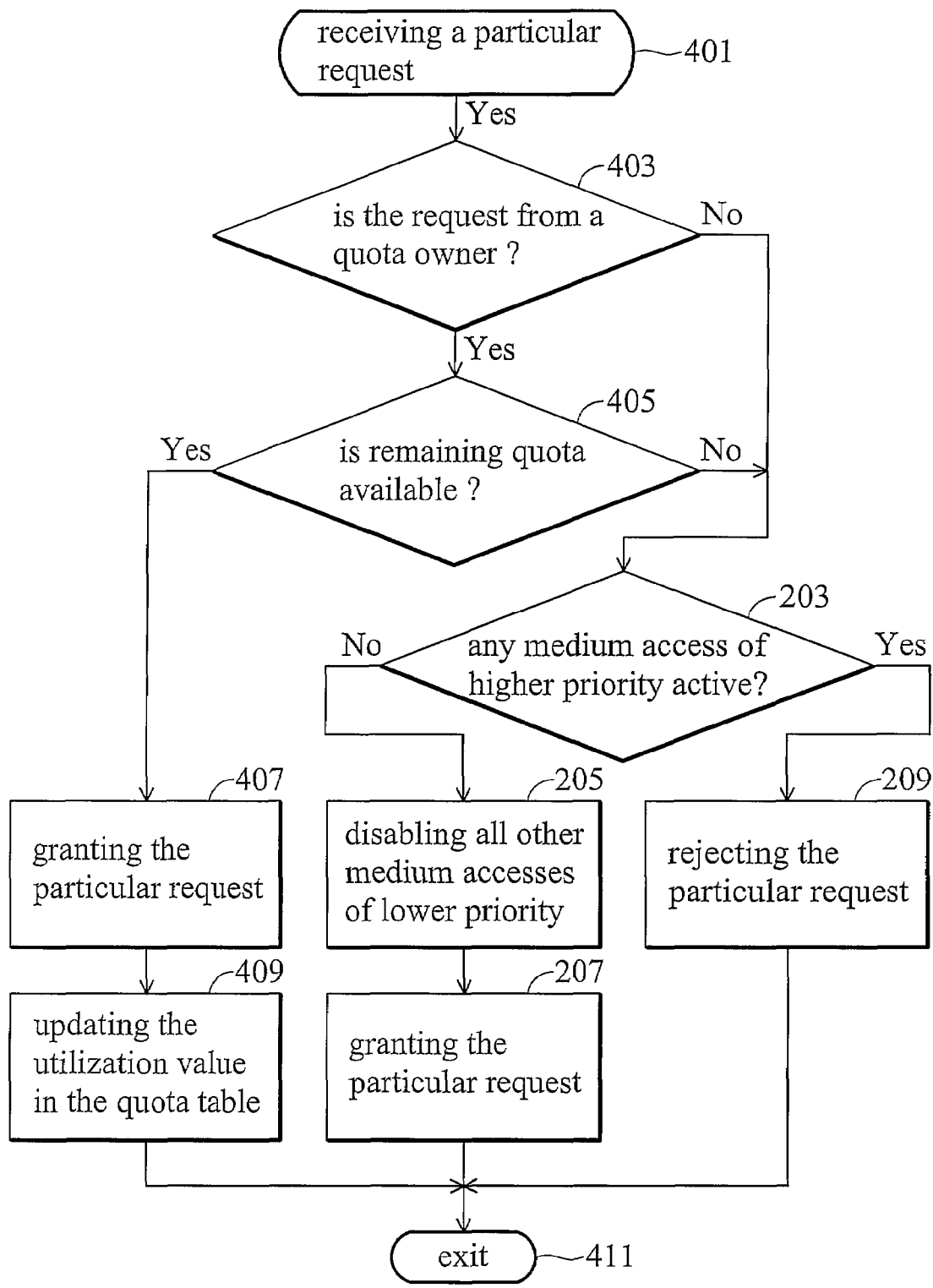
FIG. 4 is a flowchart of the arbitration method implemented in the device 300 according to FIG. 3.

Referring to FIG. 4, a flowchart of the arbitration method implemented in the device 300 according to FIG. 3 is shown. In step 401, after the device 300 is initialized, a request #RQ delivered from either WLAN module 110 or Bluetooth module 120 is received. In step 403, the arbitration circuit 310 determines whether the request #RQ is from the quota owner which owns the quota table 304. If not, a conventional priority controlling approach such as PTA mechanism is processed in step 203. If the request #RQ has originated from the quota owner, step 405 is processed, in which the arbitration circuit 310 checks quota table 304 to see whether any available quota is left for the requested medium access. Specifically, the quota for the quota owner is used up if the total consumed time slots exceed the reservation quota. In this situation, the process also goes to the conventional priority control approach in step 203. In step 407, the request #RQ is granted as long as there is still quota available, and consequently, a medium access corresponding to the request #RQ is instantly initiated as if it has the highest priority, while other traffic on opposing modules are simultaneously interrupted or suspended. On completion of the medium access corresponding to the request #RQ, a utilization value in the 304 is updated according to the total consumed time slots, and a remaining quota is calculated accordingly.

For the situation where step 203 is triggered to perform a conventional priority controlling approach such as the PTA mechanism according to IEEE 802.15.2, the arbitration circuit 130 may check whether any traffic of higher priority is currently active on the opposing module. For example, if the request #RQ is issued from the WLAN module 110, the Bluetooth module 120 is checked, and vice versa. In step 203, if a positive result is checked, the current request #RQ is rejected in step 209. Otherwise result of step 203 goes to step 205, in which traffic of lower priorities on the opposing module are unconditionally suspended. For example, when a request #RQ of IEEE 802.11 is issued from the WLAN module 110, the Bluetooth module 120 is checked whether a BT SCO medium access is active. The request #RQ of IEEE 802.11 is granted when the BT SCO traffic is inactive, and when it is granted, any traffic of lower priority such as BT ACL on the Bluetooth module 120 will be forcibly suspended, allowing the medium access of IEEE 802.11 to be activated. In step 207, when traffic of lower priorities on the opposing module is suspended, the medium access corresponding to the granted request #RQ is initiated. Steps 409, 207 and 209 are followed by step 411, thus, concluding the flowchart.

The embodiment is particularly adaptable for a mobile device comprising both WLAN module 110 and Bluetooth module 120, whereby a quota based traffic management scheme is provided in addition to conventional priority based control. However, the protocols are not limited to WLAN and Bluetooth. Any types of traffics sharing the same frequency bands or communication channels at the same time, should be applicable in this invention. The reservation quota may be flexibly adjusted according to traffic requirements, and more than one quota tables 304 may be simultaneously implemented for traffics of different priorities. Further, the method of inventions can be employed in different ways in accordance with design necessity. For example, the arbitration circuit 310 is not necessarily a separated and single circuit; that is the arbitration circuit 310 may be divided and a part of it is built in the WLAN module 110 while the other part is built in the Bluetooth module 120 in accordance with desired functions.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An arbitration circuit scheduling traffics of a first module and a second module co-located in a system sharing one communication channel to perform medium accesses of first and second protocols respectively, the arbitration circuit comprising:
    a quota table, maintaining a utilization value updated in accordance with the amount of time slots consumed by a particular traffic type; and
    a time counter, periodically resetting the utilization value to a default value; wherein:
    when the arbitration circuit receives a request for medium access of the particular traffic type, the arbitration circuit determines whether to grant the request according to the utilization value, and allows the first or second module which issues the request to initiate the medium access of the particular traffic type if the request is granted.

2. The arbitration circuit as claimed in claim 1, wherein the first protocol is wireless local area network (WLAN) protocol.

3. The arbitration circuit as claimed in claim 1, wherein the second protocol is Bluetooth protocol.

4. The arbitration circuit as claimed in claim 1, wherein the arbitration circuit updates the utilization value according to the amount of the time slots consumed by the medium access of the particular traffic type upon completion of the medium access.

5. The arbitration circuit as claimed in claim 1, wherein:
    when receiving the request of the particular traffic type, the arbitration circuit checks the utilization value to determine whether a reservation quota has run out, and
    if the reservation quota has not run out, the arbitration circuit sends an enable signal to the first module or the second module where the request has originated from, such that the medium access of the particular traffic type is initiated.

6. The arbitration circuit as claimed in claim 5, wherein:
    the reservation quota is a factor of an interval, and
    the time counter periodically resets the utilization value every interval.

7. The arbitration circuit as claimed in claim 6, further comprising a priority table, defining priorities of different traffic types including the particular traffic type.

8. The arbitration circuit as claimed in claim 7, wherein:
    the traffic types comprise a IEEE 802.11 traffic, a Bluetooth SCO traffic and a Bluetooth ACL traffic, and priorities of which are maintained in the priority table; and
    the particular traffic type is selected from one of the traffic types.

9. The arbitration circuit as claimed in claim 7, wherein:
    when the arbitration circuit determines the reservation quota has run out, or when the arbitration circuit receives a request for medium access of a traffic type other than the particular type, the arbitration circuit looks up the priority table, checks whether any traffic of higher priority is currently active, and grants the request if traffic of higher priority are inactive.

10. The arbitration circuit as claimed in claim 9, wherein when the request is granted the arbitration circuit suspends traffics of lower priority to initiate the medium access corresponding to the granted request.

11. An arbitration method for a system comprising first and second modules to schedule traffics of the first and second modules wherein the first and second modules share one communication channel and perform medium accesses according to first and second protocols respectively, the arbitration method comprising:
    providing a quota table to maintain a utilization value updated in accordance with the amount of time slots consumed by a particular traffic type;
    receiving a request for medium access of the particular packet type issued from the first or second module; and
    determining whether to grant the request for the medium access of the particular traffic type according to the utilization value.

12. The arbitration method as claimed in claim 11, wherein the utilization value is periodically reset to a default value.

13. The arbitration method as claimed in claim 11, further comprising sending an enable signal to the first or second module where the request has originated from to initiate the medium access of the particular traffic type when the request is granted.

14. The arbitration method as claimed in claim 11, wherein the first protocol is wireless local area network (WLAN) protocol.

15. The arbitration method as claimed in claim 11, wherein the second protocol is Bluetooth protocol.

16. The arbitration method as claimed in claim 11, further comprising updating the utilization value according to the amount of time slots consumed by the medium access of the particular traffic type upon completion of the medium access.

17. The arbitration method as claimed in claim 11, wherein the determination comprises:

checking the utilization value to determine whether a reservation quota has run out; and granting the request if the reservation quota has not run out.

18. The arbitration method as claimed in claim 17, wherein the reservation quota is a factor of an interval, and the utilization value is reset every interval.

19. The arbitration method as claimed in claim 17, further comprising providing a priority table defining priorities of different traffic types including the particular traffic type.

20. The arbitration method as claimed in claim 19, wherein:

the traffic types comprise a IEEE 802.11 traffic, a Bluetooth SCO traffic and a Bluetooth ACL traffic, and priorities of which are maintained in the priority table; and the particular traffic type is selected from one of the traffic types.

21. The arbitration method as claimed in claim 19, further comprising:

looking up the priority table and checking whether any traffic of higher priority is currently active when the reservation quota has run out or when another request of a traffic type other than the particular traffic type is issued;

granting the request for medium access of a traffic type other than the particular traffic type if traffic of higher priority are inactive; and suspending traffics of lower priority to initiate the medium access corresponding to the granted request when the request is granted.

22. A system comprising:

a first module operating in accordance with a first protocol;

a second module operating in accordance with a second protocol and sharing a communication channel with the first module; and an arbitration circuit, coupled to the first and second modules to schedule traffics thereof wherein the arbitration circuit comprises:

a quota table, maintaining a utilization value updated in accordance with the amount of time slots consumed by a particular traffic type; and a time counter, periodically resetting the utilization value to a default value; wherein:

when the arbitration circuit receives a request for medium access of the particular traffic type, the arbitration circuit grants the request according to the utilization value such that the first module or the second module which issues the request initiates the medium access of the particular traffic type accordingly.

23. The system as claimed in claim 22, wherein the first protocol is wireless local area network (WLAN) protocol and the second protocol is Bluetooth protocol.

24. The system as claimed in claim 22, wherein when receiving the request of the particular traffic type, the arbitration circuit checks the utilization value to determine whether a reservation quota has run out, and if the reservation quota has not run out, the arbitration circuit sends an enable signal to the first module or the second module where the request has originated from, such that the medium access of the particular traffic type is initiated, wherein the reservation quota is a factor of an interval, and the time counter periodically resets the utilization value every interval.

25. The system as claimed in claim 24, further comprising a priority table, defining priorities of different traffic types including the particular traffic type, wherein when the arbitration circuit determines the reservation quota has run out, or when the arbitration circuit receives a request for medium access of a traffic type other than the particular traffic type, the arbitration circuit looks up the priority table, checks whether any traffic of higher priority is currently active, and grants the request for medium access of a traffic type other than the particular traffic type if traffic of higher priority are inactive.

* * * * *